United States Patent [19]

Umezu et al.

[11] Patent Number: 4,892,079
[45] Date of Patent: Jan. 9, 1990

[54] MAGNETOGENERATOR

[75] Inventors: Kazuhisa Umezu; Masayuki Ozawa, both of Hyogo, Japan

[73] Assignee: Mitsubishi Denki Kabushiki Kaisha, Tokyo, Japan

[21] Appl. No.: 207,988

[22] Filed: Jun. 17, 1988

[30] Foreign Application Priority Data

Jun. 17, 1987 [JP] Japan .................................. 62-151656
Jun. 17, 1987 [JP] Japan ............................. 62-93610[U]
Jun. 18, 1987 [JP] Japan .................................. 62-151728
Jun. 18, 1987 [JP] Japan ............................. 62-93635[U]

[51] Int. Cl.$^4$ ......................... F02P 3/06; H02K 21/22
[52] U.S. Cl. .............................. 123/602; 123/149 C; 123/599; 310/70 A
[58] Field of Search ........... 123/149 R, 149 C, 149 D, 123/599, 602; 310/70 R, 70 A, 153, 156

[56] References Cited

U.S. PATENT DOCUMENTS 4,591,746 5/1986 Kamiyama .................. 123/149 R X

FOREIGN PATENT DOCUMENTS

3223039 12/1983 Fed. Rep. of Germany ...... 123/599

Primary Examiner—Tony M. Argenbright
Attorney, Agent, or Firm—Sughrue, Mion, Zinn, Macpeak and Seas

[57] ABSTRACT

A magnetogenerator comprises a plurality of permanent magnets arranged orderly on an inner periphery of a fly-wheel with magnetic poles thereof being alternative, a plurality of power generating coils including an ignition power generating coil and arranged within the fly-wheel in opposing relation to the plurality of permanent magnets, and a trigger pole of an angle position detector provided on the fly-wheel. The plurality of permanent magnets include a plurality of adjacently disposed first magnets each having a first peripheral length, a pair of adjacently disposed second magnets disposed adjacent the first magnets peripherally of the fly-wheel and having a second peripheral length longer than the first length by $l_1$ and a pair of third magnets disposed adjacent the second magnets, respectively peripherally, and having a third length shorter than the first length by $l_1$, a position and a peripheral length of the trigger pole being determined such that opposite ends of the trigger pole pass over an electromagnetic pick-up of the angle position detector when a polarity of an output voltage of the ignition power generating coil produced by crossing magnetic flux of the second magnets is changed.

6 Claims, 7 Drawing Sheets

MAGNETOGENERATOR

BACKGROUND OF THE INVENTION

The present invention relates to a magnetogenerator and, particularly, to a contactless multi-pole magnetogenerator.

Figure 7:
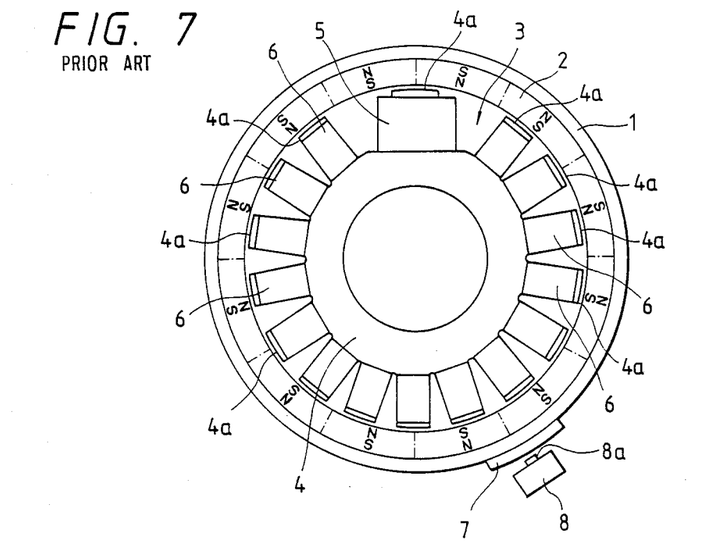
FIG. 7 is a cross section of a conventional magnetogenerator.

FIG. 7 shows an example of a conventional magnetogenerator which comprises a fly-wheel 1 in the form of a bowl which rotates in synchronism with an engine rotation and a plurality (12) of permanent magnets 2 having a common length arranged along an inner peripheral surface of the fly-wheel 1 with magnetic poles of the magnets being arranged radially alternatively. A stator 3 is arranged in a space within the fly-wheel 1.

The stator 3 comprises a magnetic core 4 in the form of a ring formed on an outer periphry thereof with a plurality (16) of radially outwardly protruding poles 4a on each of which a coil is wound to form a generating coil. One of the generating coils 5 is a relatively large cold for ignition purpose and the other 6 are for additional power generation. The power generating coil 5 is used to generate a power to be utilized by an engine ignition circuit to ignite an engine and the additional power generating coils 6 are used to generate a power for car accessories other than lamps etc. of a car.

A trigger pole 7 of an angle position detector is provided on an outer periphery of the fly-wheel 1, which produces in a signal coil a reference signal having a polarity which alternates at times when leading and trailing edges of the trigger pole 7 pass over an electrode 8a of an electromagnetic pick-up device 8. Portions of the reference signal having opposite polarities are used as a first angle signal a corresponding to a predetermined crank position of the engine and a second angle signal b corresponding to a crank position which is delayed by a predetermined angle from the position at which the first angle signal a is produced, respectively. The position or length of the trigger pole 7 with respect to the fly-wheel 1 is determined such that these reference signal portions a and b are produced within a negative half period of an output produced by the ignition power generating coil 5.

Figure 8:
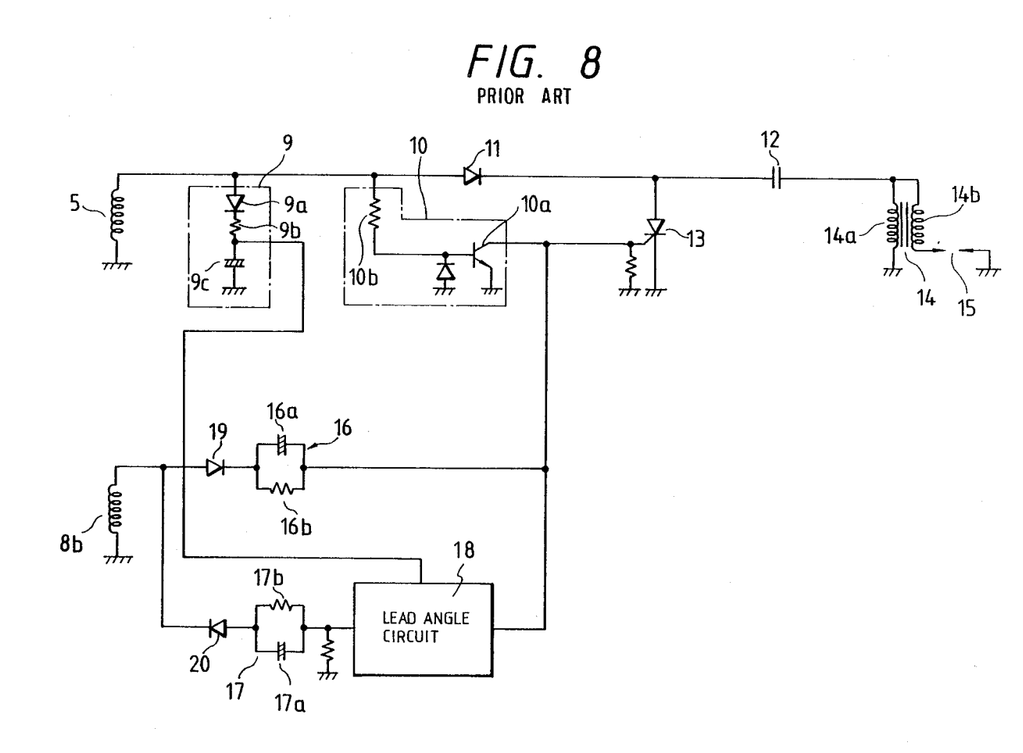
FIG. 8 is an ignition circuit diagram for use with the conventional magnetogenerator.

The operation of the magnetogenerator mentioned above will be described with reference to a circuit diagram shown in FIG. 8 and signal waveforms shown in FIG. 9. FIG. 8 is a circuit diagram of a usual capacitor discharge type ignition device (CDI) in which reference numeral 9 depicts a power source for a lead angle circuit, 10 is a mask means, 11 is a diode for rectifying an alternating output of the ignition power generating coil 5 and charging an ignition capacitor 12, and 13 is a thyristor which is a switching element for supplying charge of the capacitor 12 upon a signal from a signal source to be described to a primary coil 14a of an ignition coil 14 to discharge a high voltage induced in a secondary coil 14b thereby at an ignition plug 15 to thereby ignite the engine.

Reference numeral 8b depicts the signal coil of the electromagnetic pick-up device 8, 16 is a first RC bias circuit constituted with a capacitor 16a and a resistor 16b, 17 is a second RC bias circuit constituted with a capacitor 17a and a resistor 17b, and 18 is a lead angle circuit for controlling an igntion timing of the engine.

The alternating output prodecued by the ignition power generating coil 5 is rectified by the diode 11 and charges the capacitor 12. Simultaneously, it is also rectified by the diode 9a of the power source 9 for the lead angle circuit, is limited in current by the resistor 9b, and charges the capacitor 9c. Charge of the capacitor 9c is used as a power source for the lead angle circuit 18.

On the other hand, one portion of the output of the signal coil 8b of one polarity is rectified by the diode 19 and supplied through the first RC bias circuit 16 to a gate of the semiconductor switching element 13 as the second angle signal b, and the other signal portion of the other polarity is rectified by a diode 20 and supplied through the second RC bias circuit 17 to the lead angle circuit 18 as the first angle signal a. The lead angle circuit 18 operates the ignition timing on the first angle signal, which is supplied to the gate of the semiconductor switching element 13. In this case, since the switching element 13 is turned on by one of signals determined by the lead angle circuit 18 upon either of the first angle signal a or the second angle signal b which is determined by the output of the signal coil 8b at the engine ignition timing, charge of the capacitor 12 is supplied to the ignition coil 14 to produce a spark at the ignition plug 15.

Since the output of the ignition power generating coil 15 is supplied to a base of the transistor 10a constituting the mask means 10 through the resistor 10b, and a collector and an emitter thereof are connected to a gate of the semiconductor switching element 13 and to a grounding point, respectively, a collector-emitter circuit of the transistor 10a is on-off controlled by the output of the coil 5. That is, the transistor 10a is turned on with the positive portion of the output of the ignition power generating coil 5 to branch the ignition signal to thereby make it ineffective and is turned off with the negative portion of the output of the coil 5 to make the ignition signal effective.

Figure 9:
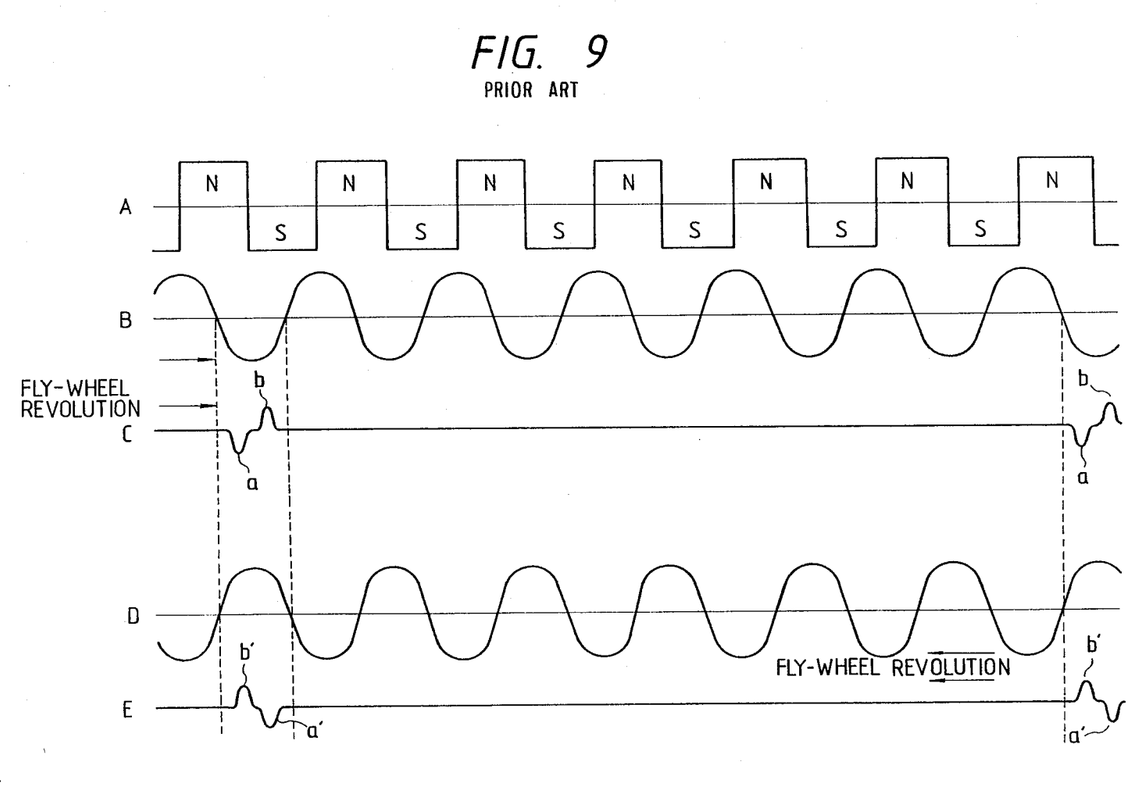

FIG. 9 shows waveforms A, B, C, D and E of magnetic flux of the magnet of the conventional magnetogenerator, an output voltage generated by the ignition power generating coil 5, voltage generated in the signal coil 8b, voltage generated by the coil 5 when the engine rotation is reversed, and voltage generated in the signal coil 8b when the engine rotation is reversed, respectively. As is clear from these waveforms, when the engine is rotating in a normal direction, the transistor 10a is cut-off with the negative portion of the output of the coil 5 and the effective ignition signal is supplied to the gate of the semiconductor switching element 13. On the other hand, since, during the reverse rotation of engine, the ignition signal is produced while the output of the coil 5 is positive on which the transistor 10a is turned on, the ignition signal from the coil 8b is ineffective and thus no ignition occurs, and as a result, a continuous reverse rotation of the engine is prevented.

However, in the CDI using the magnetogenerator having 12 magnets of a common length, a half cycle of the output of the coil 5 corresponds to 30° and, therefore, the ignition signal has to be generated within this angle. Thus, the lead angle of ignition timing must be limited not more than 30°.

SUMMARY OF THE INVENTION

An object of the present invention is to provide a magnetogenerator which is capable of being used for a variety of engines having different ignition timings by making an interval of a reference signal produced by an angle position detector thereof larger to expand the range of lead angle of ignition timing.

According to the present invention, the above object can be achieved by a magnetogenerator having a bowl shaped fly-wheel which is rotated in synchronism with an engine rotation, on an outer peripheral surface of which a trigger pole is mounted and on an inner peripheral surface of which a plurality of permanent magnets are arranged orderly peripherally, a first and a second magnet being adjacent and having a first common peripheral length, a third and a fourth magnet adjacent the respective first and second magnets each having a second common peripheral length, each of the remaining magnets having a third common peripheral length which is equal to a mean value of the first and second peripheral lengths, a peripheral length and a position of the trigger pole being determined such that an angle position detector produces a reference signal correspondingly to one of the phases of an output of an ignition power generating coil of the magnetogenerator when it crosses magnetic flux of the first and second magnets.

Another object of the present invention is to provide an ignition circuit utilizing the present magnetogenerator.

BRIEF DESCRIPTION OF THE DRAWINGS

FIGS. 3(A-I) show waveforms of an output of an ignition power generating coil of the present magnetogenerator, with a variation of magnetic flux of one of magnets used in the magnetogenerator;

FIGS. 6(A-C and F-H) are waveforms obtainable by the embodiment in FIG. 5;

FIGS. 9(A-E) show waveforms developed by the conventional magnetogenerator and ignition circuit.

DETAILED DESCRIPTION OF THE PREFERRED EMBODIMENTS

Figure 1:
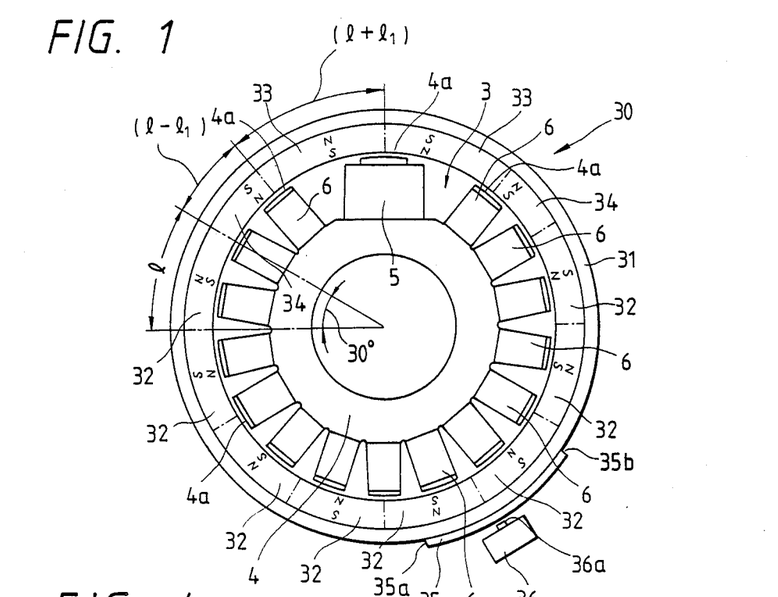
FIG. 1 is a cross sectional view of an embodiment of a magnetogenerator according to the present invention.

In FIG. 1, a magnetogenerator according to an embodiment of the present invention is depicted by a reference numeral 30, generally. The magnetogenerator 30 includes a bowl shaped fly-wheel 31 rotatable in synchronism with an engine rotation, on an inner peripheral surface of which a plurality, in this case, twelve, of magnets 32, 33 and 34 are arranged orderly in first, second region and third regions each between the first and second regions, respectively, with magnetic poles thereof being alternative. The magnets 32 include 8 magnets each having a peripheral length of l, the magnets 33 include adjacent 2 magnets each having a peripheral length of $(l+l_1)$ and the magnets 34 include 2 magnets each having a peripheral length of $(l-l_1)$, where $2l=((l+l_1)+(l-l_1))$.

The magnets 34 are disposed between the magnet 32 at one end of the first region and one of the magnet 33 and between the magnet 32 at the other end and the other magnet 33, respectively, as shown in FIG. 1.

Since the total number of the magnets is 12 in this embodiment, the length l is peripheral length of the inner periphery of the fly-wheel 31 and thus an angle corresponding to the peripheral length l is 30°, as in the conventional magneto.

A stator 3 disposed within the fly-wheel 31 is the same as that used in the conventional magneto and therefore details of its construction shown by same reference numerals are omitted for avoidance of duplication.

Figure 2:
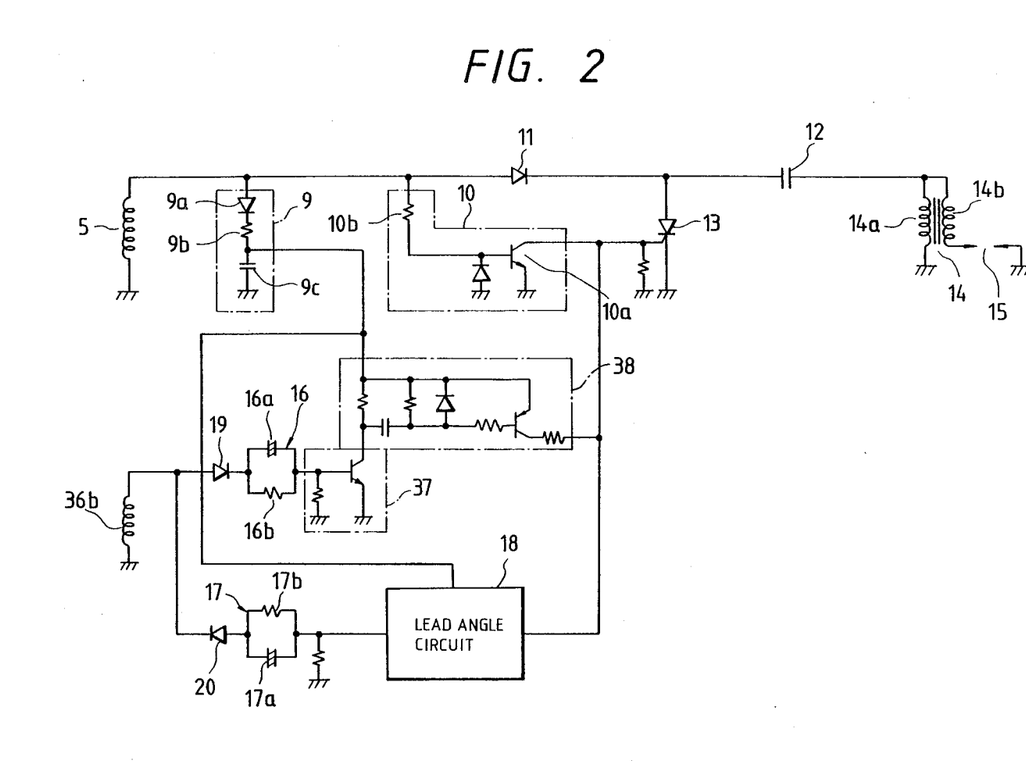
FIG. 2 is a circuit diagram of an ignition circuit to be used in combination of the present magnetogenerator.
Figure 3:
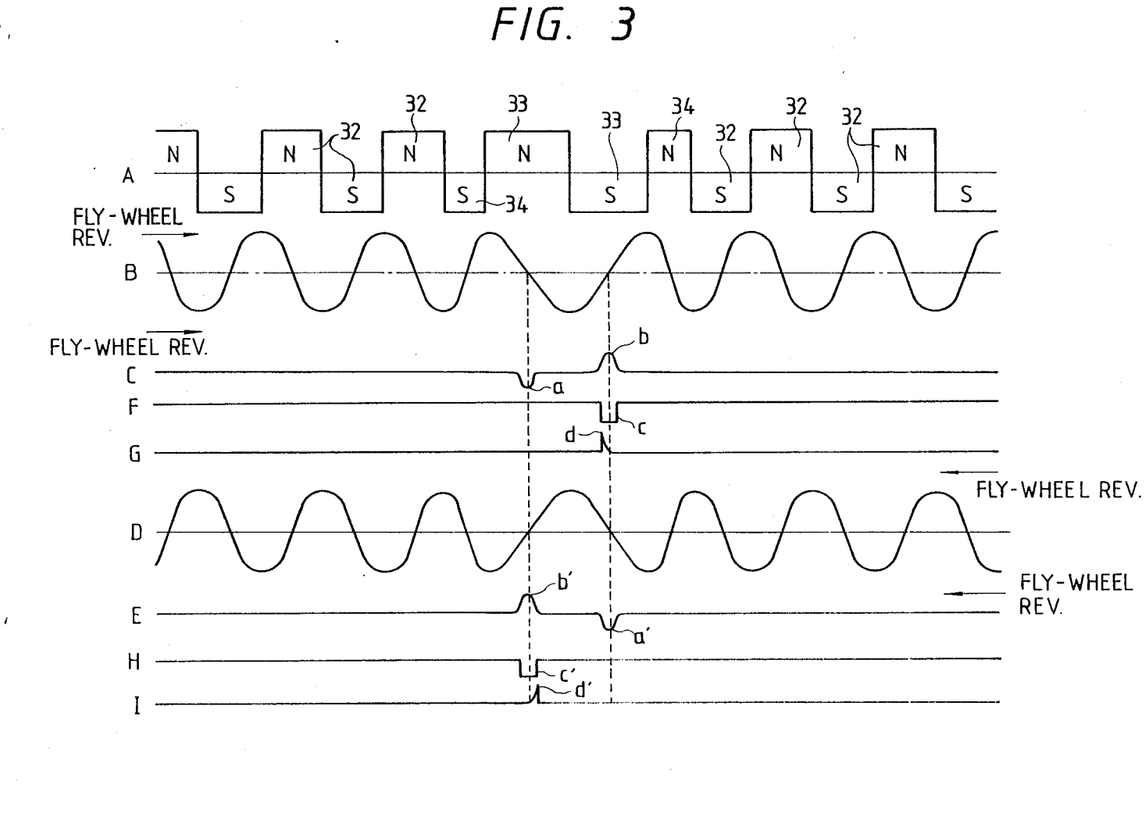

A trigger pole 35 of an angle position detector is attached onto an outer periphery of the fly-wheel 31 as in the conventional magneto. A peripheral length and its position on the fly-wheel 31, however, are determined in this embodiment such that a leading end 35a and a trailing end 35b of the trigger pole 35 pass an electrode 36a of an electromagnetic pick-up 36 so that a signal coil 36b (FIG. 2) of the electromagnetic pick-up 36 produces reference signal (a first angle signal a and a second angle signals b) at times when an output voltage of the ignition power generating coil 5, which is generated when the coil 5 crosses magnetic flux from the magnets 33 during a rotation of the fly-wheel 31, changes from positive to negative and from negative to positive, respectively, as to be described in detail with reference to FIG. 3.

Now, the operation of the magnetogenerator shown in FIG. 1 will be described in detail with reference to FIGS. 2 and 3. In FIG. 2, the capacitor discharge type ignition circuit differs from the conventional circuit shown in FIG. 8 in that it includes circuit portions 37 and 38 encircled by chain lines. The circuit portion 37 comprises a wave-shaper composed of a transistor and functions to wave-shape a positive portion b of the reference signal (waveform C in FIG. 3) produced by the signal coil 36b into a rectangular wave c (waveform F in FIG. 3). The circuit portion 38 is a differentiating circuit composed of a transistor and differentiating elements and functions to differentiate the rectangular signal c (waveform F in FIG. 3) to obtain a pulse signal d (waveform G in FIG. 3).

The basic operation for engine ignition is the same as that in the conventional circuit. However, as shown by the waveform B of the output voltage of the ignition power generating coil 5 in FIG. 3, the negative portion thereof is longer correspondingly to the long magnet 33 and the reference signals a and b are produced at the leading and trailing time points of the negative portion of the output voltage of the coil 5. Therefore, it is possible to make the lead angle width very large. However, due to the reference signals a and b positioned at the 0 crossing points of the output voltage, there may be an erroneous ignition when the engine rotation is reversed.

That is, waveforms D, E, H and I in FIG. 3 correspond to the waveforms B, C, F and G mentioned above, respectively, when the engine rotates in the reverse direction. In such case, the output voltage waveform D and the reference signal waveform E are reversed with respect to the waveforms B and C and the rectangular signal position (waveform H) is shifted correspondingly. In this case, a peak point of the second angle signal b' is positioned in a changing point of the output voltage D from negative to positive. Therefore, a half portion thereof which is in the negative side can not be masked as shown by the waveform E and inputted to the gate of the semiconductor switching element 13, causing an ignition operation.

In this embodiment, the second angle signal b' after being waveshaped into a rectangular signal c' is differentiated to obtain a signal d' as shown by the waveform I so that the pulse d' becomes within a positive portion of the output voltage waveform D and thus becomes ineffective. Therefore, the erroneous ignition is prevented when the reverse engine rotation occurs.

It should be noted, in this embodiment, that the peripheral length $(l-l_1)$ of the magnet 34 has to be equal to or larger than a peripheral length of the protrusion 4a, otherwise the ignition power generating coil 5 would thereon may cover the magnets on both sides of the magnet 34 when the latter passes over the coil 5, causing an output of the coil 5 blurred.

Figure 4:
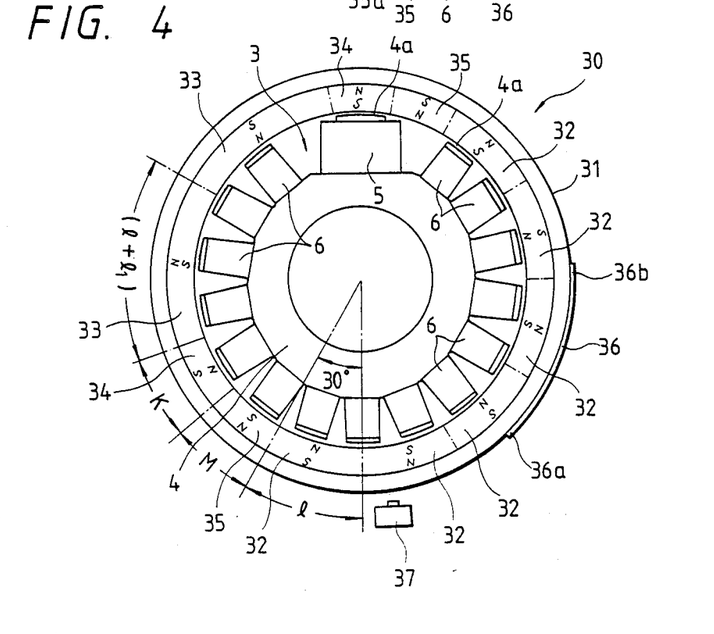
FIG. 4 is a cross section of another embodiment of the present invention.

FIG. 4 shows another embodiment of the present invention which is similar to the embodiment shown in FIG. 1 except that the third peripheral region on the magnetic includes a magnet 35 having peripheral length of M which satisfies $$2l = l_1 + M + K$$

where K is a peripheral length of the magnet 34. That is, in this embodiment, the additional peripheral length of the magnet 33 is supported by not only the magnet 34 but also the magnet 35. The operation of the this embodiment together with the ignition circuit shown in FIG. 2 is the same as that of the embodiment in FIG. 1 although the magnetic flux distribution and the output voltage waveform of the ignition power generating coil 5 are slightly different from those of the embodiment of FIG. 1, as is very clear for those skilled in the art.

Figure 5:
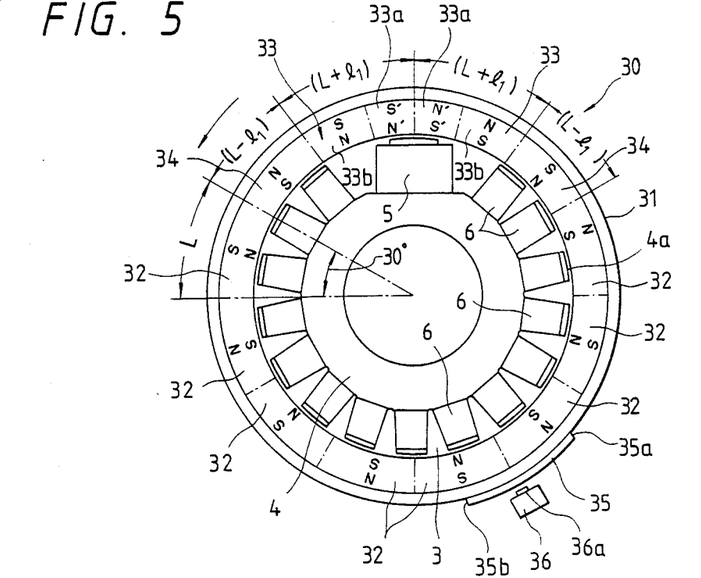
FIG. 5 is a cross section of a further embodiment of the present invention.
Figure 6:
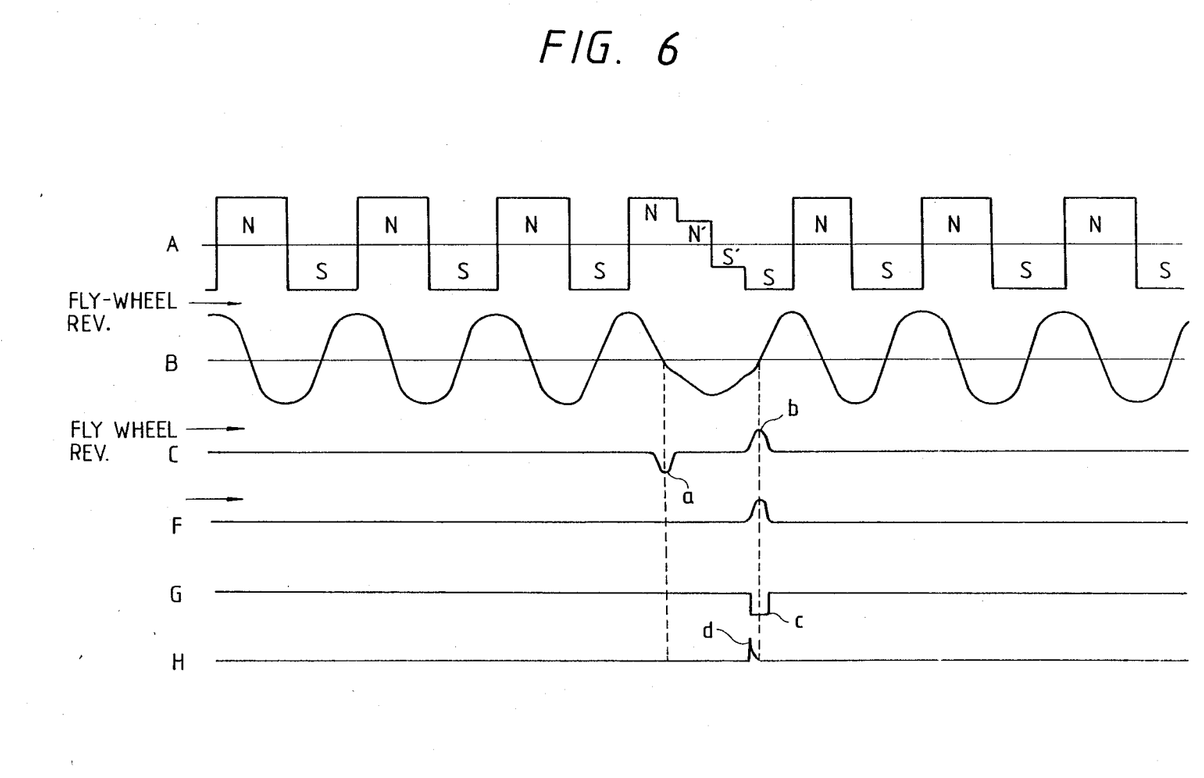

FIG. 5 shows another embodiment which differs from the embodiment shown in FIG. 1 only in that each of the magnets 33 is composed of parallel magnet portions 33a and 33b. The magnet portion 33b of the magnet 33 has the same flux density as that of the adjacent magnet 34 and the flux density of the magnet portion 33a is made lower than that of the magnet portion 33b. In FIG. 5, N and S suffixed show the magnets having lower flux density. As shown in FIG. 6, the output waveform of the ignition power generating coil 5 in this embodiment is substantially the same as that shown in FIG. 3 although the portion thereof corresponding to the magnet portions 33a and 33b is not so sharp as that in FIG. 3. That is, in this embodiment, due to a mild flux change of the magnet 33 when it passes over the coil 5, the changing points of polarity of the output voltage (B) are slightly shifted to the sides of the magnet portions 33b, respectively. Therefore, it is possible to expand the negative portion of the output voltage of the coil 5. This is also effective to prevent a power output of the additional power generating coil 6 from being lowered. Other operational merits of this embodiment are substantially the same as those mentioned before.

It should be noted in this and other embodiments that the peripheral length of the magnet 33 with respect to the magnet 32 may be changed to make the degree of expansion of the negative portion of the output voltage of the ignition power generating coil 5 as desired. In such case, the peripheral length of the magnet 34 should be changed correspondingly.

It should also be noted that the magnets 32, 33 and 34 may be formed by magnetizing a ring shaped ferromagnetic material with a suitable pole pattern or by assembling a plurality of ring sectors each magnetized with a suitable pole pattern, although these magnets are shown as prepared separately and then assembled. Further, although in the described embodiment the trigger pole is formed on the outer surface of the fly-wheel, it may be possible to use a separately prepared rotary member rotatable in synchronism with engine for the same purpose.

As mentioned hereinbefore, according to the present invention, it is possible to expand the lead angle width without degrading the output voltage of the magnetogenerator, so that the output thereof can be applied to any ignition timing of the engine.

What is claimed is:

1. A magnetogenerator comprising a bowl shaped fly-wheel adapted to be rotated in synchronism with a rotation of an engine having an associated ignition circuit, a plurality of permanent magnets arranged orderly on an inner periphery of said fly-wheel with magnetic poles thereof being alternative, a plurality of power generating coils including an ignition power generating coil and arranged within said fly-wheel in opposing relation to said plurality of permanent magnets and a trigger pole of an angle position detector provided on a member rotatable in synchronism with the engine rotation for producing a reference signal for an ignition timing control at a predetermined crank position of the engine, said plurality of permanent magnets including a plurality of adjacently disposed first magnets (32) each having a first peripheral length l, a pair of adjacently disposed second magnets (33) disposed adjacent said first magnets peripherally of said fly-wheel and having a second peripheral length longer than said first length by $l_1$ and a pair of third magnets (34) disposed adjacent said second magnets, respectively peripherally, and having a third length shorter than said first length by $l_1$, a position and a peripheral length of said trigger pole being determined such that opposite ends of said trigger pole pass over an electromagnetic pick-up of said angle position detector when a polarity of an output voltage of said ignition power generating coil produced by crossing magnetic flux of second magnets is changed.

2. The magnetogenerator as claimed in claim 1, wherein said rotatable member is said fly-wheel.

3. The magnetogenerator as claimed in claim 2, wherein each said first magnet and each said third magnet have a first flux density and wherein each said second magnet comprises a first magnet portion and a second magnet portion, said first magnet portions being adjacent each other and each having a common flux density smaller than said first flux density.

4. The magnetogenerator as claimed in claim 2, wherein said third length is equal to or larger than a peripheral length of said ignition power generating coil, further comprising fourth magnets disposed adjacent said third magnets and having a fourth peripheral length, respectively, a sum of said third length, said fourth length and said difference being equal to twice said first length.

5. The magnetogenerator as claimed in any of claims 1 to 4 wherein said first length is one twelfth an inner peripheral length of said fly-wheel.

6. An ignition control device for an engine comprising a magnetogenerator as claimed in any of claims 1 to 4, an ignition circuit including a mask means for selectively nullifying an ignition signal supplied to a semiconductor switching element thereof dependent upon a polarity of an output voltage of said ignition power generating coil of said magnetogenerator, an angle position detector for producing first and second angle signals correspondingly to said polarity change of said output voltage of said ignition power generating coil, a lead angle circuit for operating an ignition timing on the basis of said first angle signal and supplying an ignition signal to said semiconductor switching element, a waveshaper for converting said second angle signal into a rectangular signal and a differentiating circuit for differentiating said rectangular signal and supplying a differentiated signal to said semiconductor switching element.

* * * * *